Figure 1:
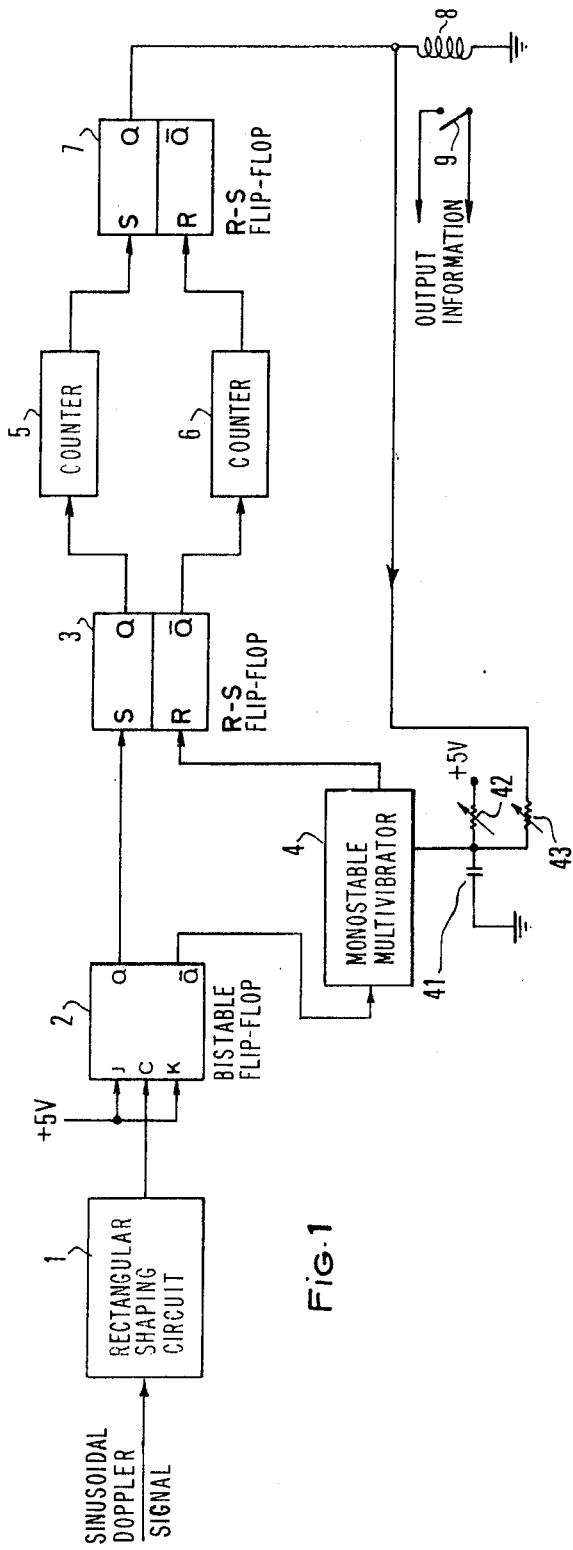

United States Patent [19]
Preti

[11] 3,836,965
[45] Sept. 17, 1974

[54] METHOD AND APPARATUS FOR THE DETECTION OF A PRESENCE

[75] Inventor: Jean-Claude Preti, Clamart, France

[73] Assignee: Societe De Fabrication D'Instruments De Measure (S.F.I.M.), Massy, France

[22] Filed: Jan. 31, 1973

[21] Appl. No.: 328,288

[30] Foreign Application Priority Data
Sept. 12, 1972 France .............................. 72.32248

[52] U.S. Cl. ................. 343/8, 340/38 R, 343/7 ED
[51] Int. Cl. .............................................. G01s 9/44
[58] Field of Search ............ 343/7 ED, 8; 340/38 R

[56] References Cited
UNITED STATES PATENTS

| | | |
|---|---|---|
| 2,355,607 | 8/1944 | Shepherd ......................... 343/7 ED |
| 2,965,893 | 12/1960 | Barker .............................. 343/7 ED |
| 3,122,740 | 2/1964 | Kruse et al. .................. 343/7 ED X |
| 3,181,150 | 4/1965 | Ruppersberg et al. .................. 343/8 |
| 3,182,312 | 5/1965 | Daniels ........................... 343/7 ED |
| 3,195,126 | 7/1965 | Barker ............................... 343/8 X |

*Primary Examiner*—Malcolm F. Hubler
*Attorney, Agent, or Firm*—Donald D. Jeffrey

[57] ABSTRACT

A vehicle presence detector circuit for the control of coloured light traffic signals in which the output of a Doppler radar system, representing the speed of vehicles, operates a relay when the speed drops below a threshold value and the relay is only reset when the speed signal exceeds a higher threshold value.

6 Claims, 2 Drawing Figures

METHOD AND APPARATUS FOR THE DETECTION OF A PRESENCE

The present invention relates to presence detector circuits of the type intended to provide input signals for the control units of three-coloured lights controlling traffic, particularly at crossroads.

Presence detectors based on induction coils and transit or passage detectors formed of Doppler effect radar systems are already well known. The way of making induction coils act as transit detectors is also well known.

Detectors, whether presence detectors or transit detectors, are bedded into each of the roads leading to a crossroads to supply information regarding the traffic with a view to controlling the three-coloured traffic lights signals in as effective a way as possible.

Whether fitted into presence detectors or transit detectors, coil detectors have several drawbacks: they provide little information in relation to time; they cover a relatively small space on the ground and, as a result, they often need to have two parallel turns embedded; furthermore, their installation requires breaking up the surface of the road.

Doppler radar as used at present in the traditional way (French Pat. No. 1,349,431 and its first Certificate of Addition 84,800) has the drawback of not being able to provide information regarding presence.

On the other hand in French Pat. No. 1,421,496, the Applicant put forward a Doppler effect radar system with a frequency-modulated transmitted signal which provides presence detection. This apparatus works well but has the drawback of being complicated and of providing a presence signal and a transit signal separately, thereby causing problems of combination of these two types of information when control of three-coloured traffic lights is involved.

The object of the present invention is a presence detector circuit formed of a Doppler radar system of the traditional type specially adapted to allow simple control of three-coloured traffic lights.

The applicant has noticed that the speed of movement pattern supplied at the output of a Doppler radar system can be utilized to obtain a presence detector working in at least as satisfactory manner as inductive coil detectors, while, at the same time, providing the advantage of a much quicker response to traffic.

A main charactertistic of the present invention is to provide a Doppler radar system in which the output representative of the speed of vehicles is compared to a first threshold to control the change of state of a relay when the speed of a vehicle falls below the threshold. A second threshold is then used so that the relay can be held in the second state until a vehicle is detected at a speed greater than the second threshold value. The first threshold value, together with the differences between the two thresholds, can with advantage be regulated separately on the circuit.

Another characteristic of the invention is that the presence pattern so obtained is used to draw up a pattern of rate of occupation by integration of the time during which the relay is closed. The integration may be numerical with the time defined by clock impulses which are counted or not, depending on the state of the relay. Integration may also be achieved in an analogue manner advantageously with reference to clock impulses.

The pattern of rate of occupation is either used directly or else compared to a certain number of different thresholds, thereby giving a discontinuous output pattern consisting of levels of rates of occupation.

Figure 2:
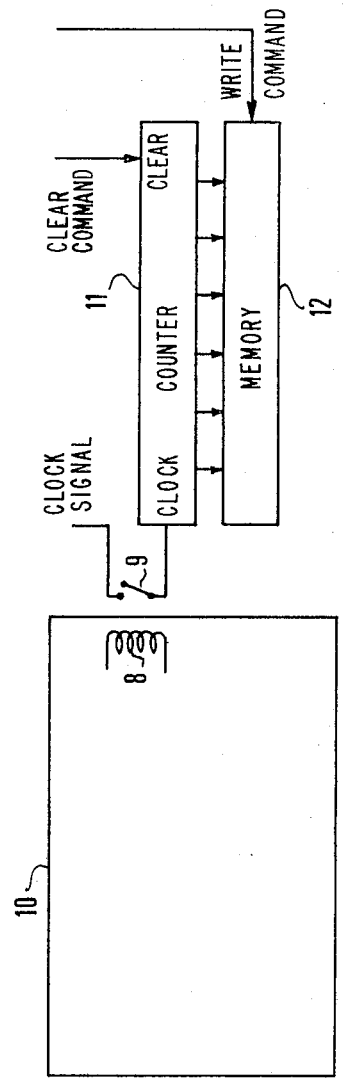

Other characteristics and advantages of the invention will become clear from reading the detailed description which follows and which refers to the attached drawings. These drawings which are given for purposes of example and are not restrictive, are as follows:

FIG. 1 is the electrical diagram of a form of embodiment of a presence detector in accordance with the present invention, and FIG. 2 is the electrical diagram of a form of embodiment of a rate of occupation detector which includes a presence detector in accordance with the invention.

It is known that a Doppler signal is often obtained by beating between a frequency transmitted by the aerial and the frequency received by this aerial which differs from the first in a manner substantially proportional to the speed of the moving bodies. It is admitted that the aerial system is so arranged as to be sensitive to only one vehicle at a time.

This Doppler signal which is of a fairly substantial sinusoidal form is applied to a rectangular shaping circuit 1 (trigger) illustrated in FIG. 1. The trigger output 1 produces a rectangular signal applied to a bistable flip-flop 2 mounted as a divider by 2 and which produces at outputs Q and $\bar{Q}$ two rectangular signals of opposite phase, the length of the rectangle being equal to the period of the Doppler signal.

To advantage, the flip-flop is of the J-K type and receives a level ONE at its inputs J and K while its clock input C receives the output signal of the circuit 1.

The output Q of the J-K bistable 2 is applied to the S input of a bistable flip-flop 3. The signal of the output $\bar{Q}$ of the bistable 2 is applied to a monostable flip-flop 4 having a delay defined in a manner already known by means of a condenser 41 and a resistance 42. In accordance with the present invention, the resistance 42 is adjustable in order to allow adjustment of the delay of the monostable flip-flop 4. The output of the monostable flip-flop 4 is applied as a zero point correction signal to input R of the bistable flip-flop 3.

The outputs Q and $\bar{Q}$ of the bistable flip-flop 3 are applied respectively through numerical counters 5 and 6 to the inputs S and R of a flip-flop 7. The counters 5 and 6 have the same modulus, i.e., the same counting capacity. Their role is to delay the response of the flip-flop 7 to any state of flip-flop 3. This cuts out the influence of parasitic signals. The output Q of the bistable 7 is applied to the excitation winding 8 of a relay whose contact 9 defines the output pattern depending on whether it is open or closed. For example, the closing of the contact 9 allows a logic level ONE to be applied to these load circuits.

The output Q of the bistable 7 is likewise applied by means of a resistance 43, which is advantageously adjustable, to the common point of the condenser 41 and the adjustable resistance 42.

In response to the descending front edge of the output $\bar{Q}$ of the flip-flop J-K2, the monostable circuit produces a rectangular pulse, the duration of which constitutes a reference period for the Doppler signal.

When the period of the Doppler signal (the length of the signals from outputs $\bar{Q}$ and Q of the bistable 2) is less than the reference period produced at the output of the monostable 4, the bistable 7 has its output Q at zero level and the relay 8 is not excited. In fact, the R-input of the bistable 3 is at level ONE LONGER THAN THE S input.

When the period of the Doppler signal is greater than the duration of the reference signal, the output Q of the bistable 7, on the contrary, excites the relay 8 with the result that the time constant of the monostable 4 and, therefore, the reference period is reduced by the resistance 43.

In this way, the closing of contact 9 takes place when the speed of a vehicle is less than a reference value which can be regulated by resistance 42. The contact 9 can only be opened subsequently if the speed of a following vehicle exceeds another reference value greater than the first; the difference between the two is defined by the value of the resistance 43, which may be adjustable to regulate the hysteresis.

It will have been noted that the adding of the resistance 43 in parallel to the resistance 42 reduces the time constant and, therefore, the length of the reference signal, thereby giving an increase in the frequency and the corresponding speed.

FIG. 2 shows a circuit for measuring the rate of occupation. The block 10 represents the circuit of FIG. 1 with the relay 8 and its contact 9.

During the closing of the contact 9, clock impulses are applied to a counter 11. From time to time, the contents of the counter 11 are sampled, for example, in a memory 12 in response to a recording control and the counter 11 is reset to zero by a signal applied to its clear input.

Naturally, it is possible to replace the numerical counter 11 with an analogue integrator with a condenser periodically sampled and reset to zero.

In either system, the magnitude sampled is a measure of rate of occupation which can either be used directly or else compared with threshold values.

The applicant has noticed that the apparatus which is the subject of the invention works well when the first reference speed is between 5 and 15 kilometers per hour, preferably between 10 and 15 kilometers per hour. The second reference speed is chosen in excess of the first by 3 to 5 kilometers per hour.

I CLAIM:

1. A method of detecting vehicles waiting for free way at a traffic light, comprising the steps of
   continuously monitoring on the road to said traffic light an area substantially corresponding to one vehicle by a Doppler radar system capable of giving an output velocity signal of moving bodies in said area,
   comparing said velocity signal with a first threshold,
   setting a bistable means when said velocity signal falls below said first threshold,
   comparing said velocity signal with a second threshold when said bistable means is set, said second threshold being greater than said first threshold,
   resetting said bistable means when said velocity signal exceeds said second threshold, and
   assuming a vehicle waiting when said bistable means is set.

2. The method of claim 1, wherein the step of comparing said velocity signal with said first threshold comprises comparing said velocity signal with a switchable threshold means which is normally reset to a first threshold value and which can be set to a second threshold value, greater than said first threshold value, the step of setting said bistable means includes setting said switchable threshold means to said second value thereof, the step of comparing said velocity signal with said second threshold comprises comparing again said velocity signal with said switchable threshold means, set to said second value, and the step of resetting said bistable means includes resetting said switchable threshold means to said first value thereof.

3. The method of claim 1, wherein said bistable means is a relay.

4. The method of claim 1, wherein the values of said first and second thresholds are adjustable.

5. The method of claim 1, wherein said first threshold value represents a first velocity between 5 to 15 kilometers per hour, and said second threshold value represents a second velocity in excess of the first velocity by 3 to 5 kilometers per hour.

6. The method of claim 1, including the step of integrating over the time for which said bistable means is set, thereby obtaining the rate of occupation of said area being monitored.

* * * * *